US009294111B2

(12) United States Patent
Mahdi et al.

(10) Patent No.: US 9,294,111 B2
(45) Date of Patent: Mar. 22, 2016

(54) REMOTE MEDIA IMS SESSIONS

(75) Inventors: Kaniz Mahdi, Carrollton, TX (US); Hengliang Zhang, Guangdong (CN); Hua Cheng, Guangdong (CN); Zhaohui Zhang, Guangdong (CN); Lili Yang, Guangdong (CN)

(73) Assignee: Futurewei Technologies, Inc., Plano, TX (US)

( * ) Notice: Subject to any disclaimer, the term of this patent is extended or adjusted under 35 U.S.C. 154(b) by 476 days.

(21) Appl. No.: 12/484,928

(22) Filed: Jun. 15, 2009

(65) Prior Publication Data

US 2009/0313378 A1      Dec. 17, 2009

Related U.S. Application Data

(60) Provisional application No. 61/100,111, filed on Sep. 25, 2008, provisional application No. 61/099,827, filed on Sep. 24, 2008, provisional application No. 61/086,504, filed on Aug. 6, 2008.

(51) Int. Cl.

| | |
|---|---|
| *G06F 15/16* | (2006.01) |
| *H03M 1/06* | (2006.01) |
| *H04L 29/06* | (2006.01) |
| *H04L 29/08* | (2006.01) |
| *H04B 10/69* | (2013.01) |
| *H04L 25/03* | (2006.01) |

(Continued)

(52) U.S. Cl.

CPC ........... *H03M 1/0624* (2013.01); *H04B 10/697* (2013.01); *H04L 25/03057* (2013.01); *H04L 25/03159* (2013.01); *H04L 63/10* (2013.01); *H04L 65/1016* (2013.01);

(Continued)

(58) Field of Classification Search

CPC ............ H04L 65/1016; H04L 65/1083; H04L 65/1093; H04L 67/14; H04L 67/148; H04L 63/10; H04L 65/1069; H04L 65/1089
USPC ...................... 709/200–232, 246; 705/26–38; 370/231–246; 725/120–135
See application file for complete search history.

(56) References Cited

U.S. PATENT DOCUMENTS

| | | | |
|---|---|---|---|
| 5,165,020 | A | 11/1992 | Sudama et al. |
| 7,082,092 | B2 | 7/2006 | Weijenbergh et al. |

(Continued)

FOREIGN PATENT DOCUMENTS

| | | |
|---|---|---|
| CN | 101018318 A | 8/2007 |
| CN | 101120556 A | 2/2008 |

(Continued)

OTHER PUBLICATIONS

ETSI 23 237, Technical Specification (3GPP GSM: Global System for Mobile Communications), The Mobile Broadband Standard, Version 8.0.0, Jun. 9, 2008, pp. 1-40.*

(Continued)

*Primary Examiner* — Oleg Survillo
(74) *Attorney, Agent, or Firm* — Slater & Matsil, L.L.P.

(57) ABSTRACT

A system and method is provided for remote session control of IP Multimedia Subsystem (IMS) sessions. A remote media flow may be established as part of an origination process wherein the controller UE requests that the media flow is established on a remote media UE as part of the origination request. A remote media flow may also be established as part of a termination process wherein the controller UE identified in the termination request identifies a remote media UE on which a remote media is to be established. Embodiments also allow for the session control to be transferred from a first device to a second device, while maintaining one or more media flows on the first device.

17 Claims, 7 Drawing Sheets

(51) Int. Cl.
*H03M 1/08* (2006.01)
*H03M 1/12* (2006.01)

(52) U.S. Cl.
CPC ....... *H04L 65/1069* (2013.01); *H04L 65/1083* (2013.01); *H04L 65/1093* (2013.01); *H04L 67/14* (2013.01); *H04L 67/148* (2013.01); *H03M 1/0604* (2013.01); *H03M 1/0607* (2013.01); *H03M 1/0836* (2013.01); *H03M 1/1215* (2013.01); *H04L 65/1089* (2013.01); *H04L 2025/03445* (2013.01)

(56) References Cited

U.S. PATENT DOCUMENTS

| | | | |
|---|---|---|---|
| 7,545,376 | B2* | 6/2009 | Hintz ............................. 345/440 |
| 7,564,866 | B2 | 7/2009 | Agazzi et al. |
| 7,979,558 | B2 | 7/2011 | Mahdi |
| 8,160,231 | B1* | 4/2012 | Meadows ................. 379/221.01 |
| 8,385,903 | B2* | 2/2013 | Ghai et al. ..................... 455/420 |
| 2002/0145632 | A1 | 10/2002 | Shmueli et al. |
| 2004/0196867 | A1* | 10/2004 | Ejzak et al. ..................... 370/468 |
| 2005/0060411 | A1* | 3/2005 | Coulombe et al. ............ 709/227 |
| 2006/0126648 | A1 | 6/2006 | Park et al. |
| 2007/0043876 | A1* | 2/2007 | Varga et al. .................... 709/245 |
| 2007/0064710 | A1* | 3/2007 | Holmstrom et al. ....... 370/395.2 |
| 2007/0192494 | A1 | 8/2007 | Yamakawa et al. |
| 2007/0195764 | A1* | 8/2007 | Liu et al. ........................ 370/389 |
| 2007/0198463 | A1 | 8/2007 | Sarakas |
| 2008/0010688 | A1* | 1/2008 | Cai et al. .......................... 726/28 |
| 2008/0040468 | A1 | 2/2008 | Mao et al. |
| 2008/0125126 | A1* | 5/2008 | Fang et al. ..................... 455/436 |
| 2009/0034534 | A1* | 2/2009 | Faccin ...................... 370/395.52 |
| 2009/0147754 | A1* | 6/2009 | Long et al. ..................... 370/331 |
| 2009/0207807 | A1 | 8/2009 | Mahdi et al. |
| 2009/0207843 | A1* | 8/2009 | Andreasen et al. ........... 370/392 |
| 2009/0245180 | A1* | 10/2009 | Wu ................................. 370/328 |
| 2010/0077459 | A1* | 3/2010 | Mahdi et al. ...................... 726/4 |
| 2010/0135279 | A1* | 6/2010 | Petersson et al. ............. 370/352 |
| 2010/0146142 | A1 | 6/2010 | Long et al. |
| 2010/0157882 | A1 | 6/2010 | Moriwaki et al. |
| 2010/0195644 | A1* | 8/2010 | Hao ............................... 370/352 |
| 2010/0202291 | A1* | 8/2010 | Synnergren et al. .......... 370/235 |
| 2010/0279670 | A1* | 11/2010 | Ghai et al. ................... 455/414.3 |
| 2010/0312834 | A1* | 12/2010 | Doken et al. .................. 709/205 |
| 2010/0312841 | A1* | 12/2010 | Doken et al. .................. 709/206 |
| 2011/0010741 | A1 | 1/2011 | Liao et al. |
| 2011/0040836 | A1* | 2/2011 | Allen et al. .................... 709/205 |

FOREIGN PATENT DOCUMENTS

| | | |
|---|---|---|
| CN | 101227571 A | 7/2008 |
| CN | 101237389 A | 8/2008 |
| CN | 101257619 A | 9/2008 |
| CN | 101369966 A | 2/2009 |
| CN | 101394605 A | 3/2009 |
| EP | 1093281 A2 | 4/2001 |
| JP | 2007104163 A | 4/2007 |
| JP | 2007264284 A | 10/2007 |
| WO | WO2006000624 * | 1/2006 |
| WO | WO 2006/088035 A1 | 8/2006 |
| WO | WO 2008/048428 A1 | 4/2008 |
| WO | WO2009018312 * | 2/2009 |
| WO | WO 2010/015204 A1 | 2/2010 |
| WO | WO 2010/015208 A1 | 2/2010 |

OTHER PUBLICATIONS

3rd Generation Partnership Project, Technical Specification Group Services and Architecture, "IP Multimedia Subsystem (IMS) Service Continuity," Stage 2, Release 9, 3GPP TS 23.237 V9.1.0, Jun. 2009. pp. 1-88.
3rd Generation Partnership Project, Technical Specification Group Services and System Aspects, "IP Multimedia Subsystem (IMS) centralized services," Stage 2, Release 9, 3GPP TS 23.292 V9.2.0, Jun. 2009, pp. 1-105.
3rd Generation Partnership Project, Technical Specification Group Services and System Aspects, "IP Multimedia Subsystem (IMS) service continuity enhancements; Service, policy and interaction," Stage 2, Release 9, 3GPP TR 23.838 V9.0.0, Jun. 2009, pp. 1-51.
3rd Generation Partnership Project, Technical Specification Group Core Network and Terminals, "IP Multimedia (IM) Core Network (CN) subsystem IP Multimedia Subsystem (IMS) Service Continuity," Stage 3, Release 8, 3GPP TS 24.237 V8.2.0, Jun. 2009, pp. 1-71.
3rd Generation Partnership Project, Technical Specification Group Core Network and Terminals, "IP Multimedia (IM) Core Network (CN) subsystem Centralized Services (ICS)," Stage 3, Release 9, 3GPP TS 24.292 V9.0.0, Jun. 2009, pp. 1-164.
"Extended European Search Report," Application No. 09804508.1-1244, Applicant: Huawei Technologies Co., Ltd., mailing date: Mar. 14, 2012, 11 pages.
Mineno, H., et al., "SIP-Based Streaming Control Architecute for Mobile Personal Area Networks," Knowledged-Based Intellegent Information and Engineering Systems Lecture Notes in Computer Science; Lecture Notes in Artificial Intelligency, Jan. 1, 2006, pp. 166-173.
Peng, C.-J., "SSIP: Split a SIP Session over Multiple Devices," Thesis, Internet citation: http://140.123.21.32/ETD-db/ETD-search/getfile?URN=etd-0727105-020000&filename=etd-0727105-020000.pdf, Jun. 2005, 54 pages.
"Extended European Search Report," Application No. 09804504.0-1244, Applicant: Huawei Technologies Co., Ltd., mailed date: Jun. 7, 2011, 13 pages.
"PCT Written Opinion of the International Searching Authority," International Application No. PCT/CN2009/073119, Applicant: Huawei Technologies Co., Ltd., et al., mailed date: Nov. 12, 2009, 5 pages.
"PCT Written Opinion of the International Searching Authority," International Application No. PCT/CN2009/073131, Applicant: Huawei Technologies Co., Ltd., et al., mailed date: Nov. 12, 2009, 5 pages.
Jana, R., et al., "Clicker-An IPTV Remote Control in Your Cell Phone," Multimedia and Expo, 2007 IEEE International Conference on IEEE, Jul. 1, 2007, pp. 1055-1058.
Shacham, et al., "Session Initiation Protocol (SIP) Session Mobility draft-shacham-sipping-session-mobility-05," Columbia University, DoCoMo Euro-Labs, Nov. 18, 2007, 40 pages.
Second Office Action with Partial English Translation received in Chinese Application No. 2009/80127326.8 dated Apr. 27, 2013, 11 pages.
Japanese Office Action Decision of Refusal with English Translation received in Japanese Patent Application No. 2011-517741 dated May 14, 2013, 5 pages.
Chinese Office Action and Partial Translation received in Chinese Application No. 200980127326.8, mailed Sep. 5, 2012, 7 pages.
Japanese Notice of Reasons for Rejection and Translation received in Japanese Application No. 2011-517741, mailed Sep. 25, 2012, 5 pages.
Minerno, Hiroshi, "Quick Transfer of Media Stream in FMC Environment," Proceedings of the First ITU-T Kaleidoscope, Innovations in NGN, Geneva, May 12-13, 2008, 8 pages.
Chinese Office Action and Partial Translation received in Chinese Application No. 2011-517741, mailed Jan. 22, 2013, 5 pages.
Shacham, Ron, et al., "Ubiquitous Device Personalization and Use: The Next Generation of IP Multimedia Communications," ACM Transactions on Multimedia Computing, Communications and Applications, vol. 3, No. 2, Article 12, May 2007, 21 pages.
Thakolsri, Srisakul, et al., "Accounting Management for Session Mobility in an Ubiquitous Environment," IWCMC, Jul. 3-6, 2006, pp. 311-316.
Japanese Office Action and Partial Translation received in Japanese Application No. 2011-517741, mailed Jan. 22, 2013, 5 pages.
Third Chinese Office Action received in Chinese Application No. 200980127326.8 mailed Nov. 20, 2013, 6 pages.

* cited by examiner

REMOTE MEDIA IMS SESSIONS

This application claims the benefit of U.S. Provisional Application No. 61/099,827, filed on Sep. 24, 2008, entitled "A Method for Setting up Sessions with Media on the Device Controlling the Session and/or a Different Device," U.S. Provisional Application No. 61/100,111, filed on Sep. 25, 2008, entitled "A Method for Setting up Sessions with Media on the Device Controlling the Session and/or a Different Device," U.S. Provisional Application No. 61/086,504, filed on Aug. 6, 2008, entitled "Remote Session control," which applications are hereby incorporated herein by reference.

CROSS-REFERENCE TO RELATED APPLICATIONS

This application relates to the following co-pending and commonly assigned patent application: Ser. No. 12/483,981, filed Jun. 12, 2009, entitled "Remote Session Control," which application is hereby incorporated herein by reference.

TECHNICAL FIELD

The present invention relates generally to telecommunications and, more particularly, to a system and method for remote session control of IP Multimedia Subsystem (IMS) sessions.

BACKGROUND

Figure 1:
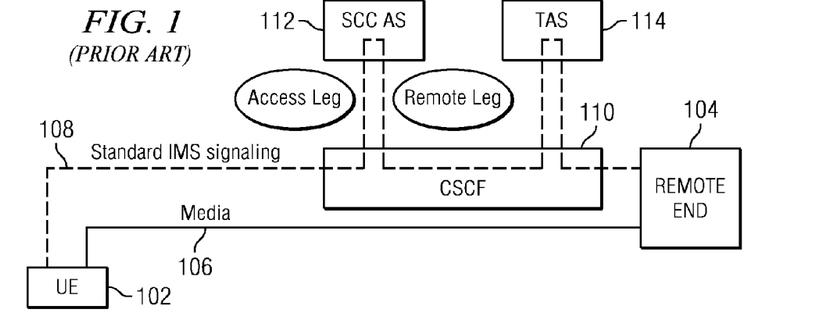
FIG. 1 depicts a signaling or bearer architecture for a prior art system.

As mobile devices improve and include more enhanced capabilities, mobile devices have evolved to act as Internet Protocol (IP) devices. One such system, e.g., a system employing IP Multimedia services (IMS) sessions, is illustrated in FIG. 1, wherein a traditional signaling or bearer architecture for a local media session is illustrated. The traditional IMS session is created between a User Equipment (UE) 102 and a remote end 104, thereby enabling the UE 102 to access media flows, such as media flow 106. The standard IMS signaling flow, illustrated in FIG. 1 by the dotted line 108, extends between a Call Session Control Function (CSCF) 110, a Service Centralization Continuity Application Server (SCC AS) 112, and a Telephony Application Server (TAS) 114 (and/or other application servers).

Generally, the CSCF 110 processes session initiation protocol (SIP) signaling packets in the IMS system, and the application servers host and execute a variety of services. In one embodiment, the SCC AS 112 operates in a Back-to-Back User Agent (B2BUA) mode wherein it acts as an SIP element to mediate SIP signaling between the UE 102 and the remote end 104. In the embodiment illustrated in FIG. 1, the SCC AS 112 establishes an access leg using IMS procedures between the SCC AS 112 and the CSCF 110 on the UE 102 side and establishes a remote leg using IMS procedures to the CSCF 110 on the remote end 104 side. Other application servers, such as the TAS 114 illustrated in FIG. 1, may be executed on the remote leg as part of standard service execution logic at the CSCF 110.

The result of an IMS session established as discussed above is a media flow 106 and a session control signaling flow 108 established between the UE 102 and the remote end 104. Unfortunately, however, the media flow 106 and the session control signaling flow 108 are tied to the same device, thereby not allowing the media flow 106 to be sent to a different device or controlled by a different device. For example, if a user is interested in watching a video, current implementations require that the media flow 106, e.g., the video, be sent to the same device, e.g., a wireless telephone, as is controlling the video. Moreover, when a media flow 106 is transferred to another device, both the session control signaling flow 108 and the media flow 106 are transferred to the same device. This situation is not always convenient or desired by the user, who may want to control the media flow 106 via one device, but watch the video on a different device, such as a computer monitor or television.

Furthermore, some IP devices are stationary, such as hardware IP phones, video-conferencing units, embedded devices, and the like. While these IP devices may be stationary, these IP devices may allow more convenience of use and additional capabilities than other more mobile IP devices, but maintain session control on the mobile IP device. As a result, it may be desirable to separate the media flow from the session control signaling flow.

Thus, there is a need for a method and system that allows the media flow to be controlled by a separate device, thereby allowing the moving of active multimedia sessions between IP devices to allow mobile and stationary devices to be used concurrently or interchangeably in mid-session, combining their advantages into a single "virtual device."

SUMMARY OF THE INVENTION

These and other problems are generally solved or circumvented, and technical advantages are generally achieved, by preferred embodiments of the present invention which provides for remote session control for IMS sessions.

Generally, embodiments of the present invention provides a system, comprising various methods and apparatuses, for remote session control of IP Multimedia Subsystem (IMS) sessions, wherein media is established using one or more devices, and multi-media session/session control for a multimedia session is provided by a device which may or may not be the same as the device on which media is established. The session/session control may also be transferred to another device while retaining one or more media flows on the original device.

For example, in an embodiment of the present invention, an IMS session is originated such that a remote media is established on a remote media UE and the originating UE provides session control, i.e., it serves as the controller UE. The originating device remains the controller device. A local media may also be originated locally on the controller UE.

In another embodiment of the present invention, a remote media session is established as part of terminating an IMS session. The controller UE receives an origination request and in response requests that a remote media flow on a remote media UE be established, such that the controller UE maintains session control. A local media flow may also be established on the controller UE.

In yet another embodiment of the present invention, the session control is transferred from original device to a (new) controller UE. In this embodiment, zero or more media flows may be transferred to the new controller UE and one or more media flows may remain with the original device, which assumes the role of a controlee UE, resulting in creation of a of a remote media flow.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

IMS sessions such as those described above with reference to FIG. 1 in which the session control signaling flow and the media flow (and the media control flow) are all transferred to a transferee device are referred to herein as a Release Control Mode (RCM). In contrast, embodiments of the present invention utilize an IMS session in which the session control signaling and the media control/media flow are separated such that the session control signaling is maintained by one UE, and the media and media control is maintained by a different UE. A session controlled by a UE that is the same as the UE controlling a media flow is referred to as a local media session, and a session controlled by a UE that is different from a UE controlling a media flow is referred to as a remote media session. Generally, as one of ordinary skill in the art will realize, embodiments of the present invention provide a singular virtual session comprising of session control and media provided by two or more devices with the linkage and association amongst the remote media and associated session control provided through IMS SIP signaling.

Figure 2:
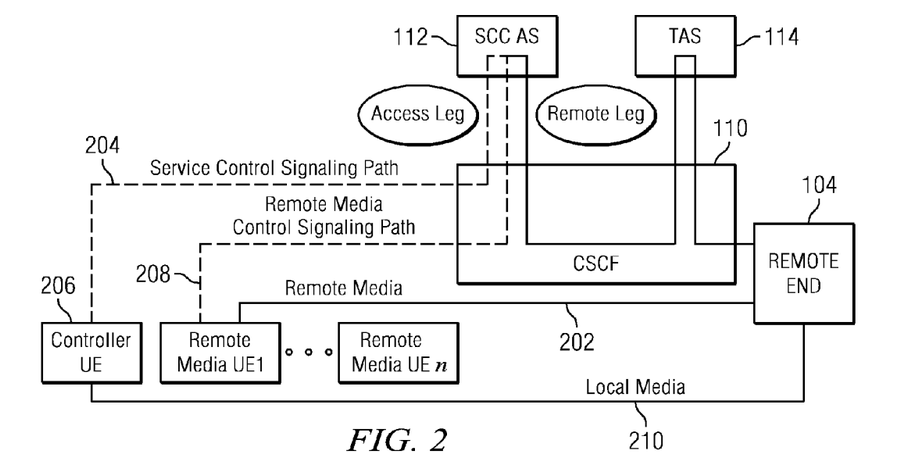
FIG. 2 depicts a signaling or bearer architecture for a remote media session according to one embodiment of the present invention.

Referring now to FIG. 2, a signaling and bearer architecture that may be utilized with embodiments of the present invention is illustrated. In this embodiment, a remote media flow 202, such as a voice and/or video, is established to one or more remote media UE1-UEn, while session control is established with a controller UE 206 via a session control signaling path 204. A remote media control signaling path 208, which provides the necessary signaling for the transmission of the remote media flow 202, is also established with the remote media UE1-UEn. A remote media flow may be established by using IMS session procedures as described herein.

As illustrated in FIG. 2, the SCC AS 112 combines the session control signaling communicated over the session control signaling path 204 with the media control signaling communicated over the remote media control signaling path 208. For B2BUA at the SCC AS 112 in FIG. 2, an access leg may be formed with a combination of the session control signaling path 204 and the remote media control signaling path 208 for representation of a remote media component. A remote leg is presented by the SCC AS 112 to the CSCF 110 as an IMS session. The TAS 114 (and/or other application servers) may be executed on the remote leg as part of standard service execution logic at the CSCF 110. Optionally, the controller UE 206 may also have a local media flow 210.

It should be noted that other network elements, such as routers, gateways, switches, and/or the like, may be present within the network. The configurations and the communications between network elements is provided for illustrative purposes only, and as such, the communications between the specified elements may be between different elements and/or through additional elements as well as different signaling/commands may be used.

As discussed in greater detail in the following paragraphs, the general principles of the present invention may be applied to various scenarios. It should be noted that the following embodiments are provided for illustrative purposes only and are not intended to limit the scope of the present invention to only those embodiments described herein. Furthermore, it should be noted that the messages and the message parameters are provided for illustrative purposes only and that other messages and parameters may be used, as well as any suitable protocol, such as session description protocol (SDP), session initiation protocol (SIP), or the like. Additional information regarding the messages and the parameters may be found in 3GPP TR 23.838, v9.0.0 and 3GPP TS 23.237, v9.1.0, which are incorporated herein by reference.

Generally, the principles of the present invention may be applied to various scenarios. For example, if a local media flow (e.g., the media flow is established on the device which maintains the end user control) is to be originated by the UE, the UE sets up the local media flow using suitable mechanisms. If a remote media flow (e.g., the media flow is established on a UE different from the UE that maintains the session control) needs to be established for the session, however, the originating UE indicates in the session setup request that a remote media flow is to be established by the network, providing information necessary for the network to establish the media flow with the remote media UE in the IMS session signaling, e.g., in the SDP. The network subsequently establishes a remote media flow with the media UE to establish the media. The network combines the local media flow (if present) and the remote media flow with the session signaling from the UE for presentation as a remote leg to the remote end.

For session terminations, the network forwards in incoming session to the UE using suitable mechanisms. When accepting the incoming session request, if a local media flow needs to be established for the session, the UE establishes the local media flow using suitable mechanisms. If a remote media flow needs to be established for the session, the UE indicates in the session setup response that a remote media flow is to be established by the network, providing information necessary for the network to establish the remote media flow with the media UE in the IMS session signaling, e.g., in the SDP. The network subsequently sets up a remote media flow with the media UE.

Figure 3:
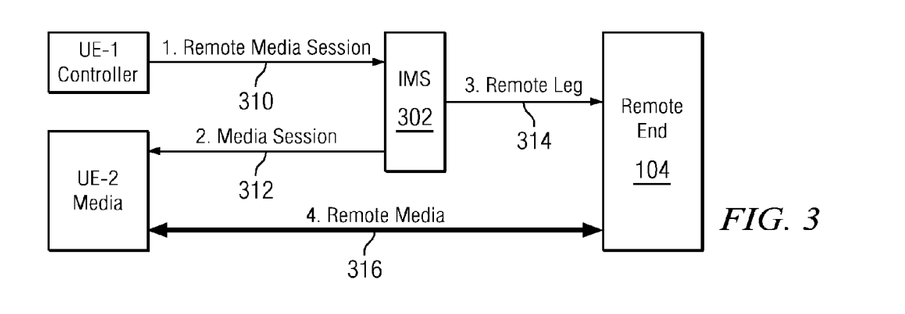
FIG. 3 is a signaling architecture diagram for originating a remote media session in accordance with an embodiment of the present invention.

Referring now to FIG. 3, a signaling architecture diagram illustrating a process for originating a remote media session is shown in accordance with an embodiment of the present invention. Initially, UE-1 initiates a remote media session to establish a remote media flow on UE-2 by transmitting a remote media session request as indicated by reference numeral 310 to the IMS system 302. The IMS system 302 transmits a media session message to UE-2 as indicated by reference numeral 312 and establishes a remote leg with the remote end 104 as indicated by reference numeral 314. As a result, a remote media flow is established between the remote end 104 and UE-2 as indicated by reference numeral 316. In this situation, UE-1 is the controller UE, and UE-2 is the media UE.

It should be noted that the IMS system 302 is illustrated generically to demonstrate the concepts of this embodiment of the present invention. One of ordinary skill in the art will realize that the IMS system 302 may include several elements, including the CSCF 110 and SCC AS 112 network elements that are identified in the message flow diagrams included herein. Other components, such as various switches, routers, gateways, or the like, may also be included.

Figure 4:
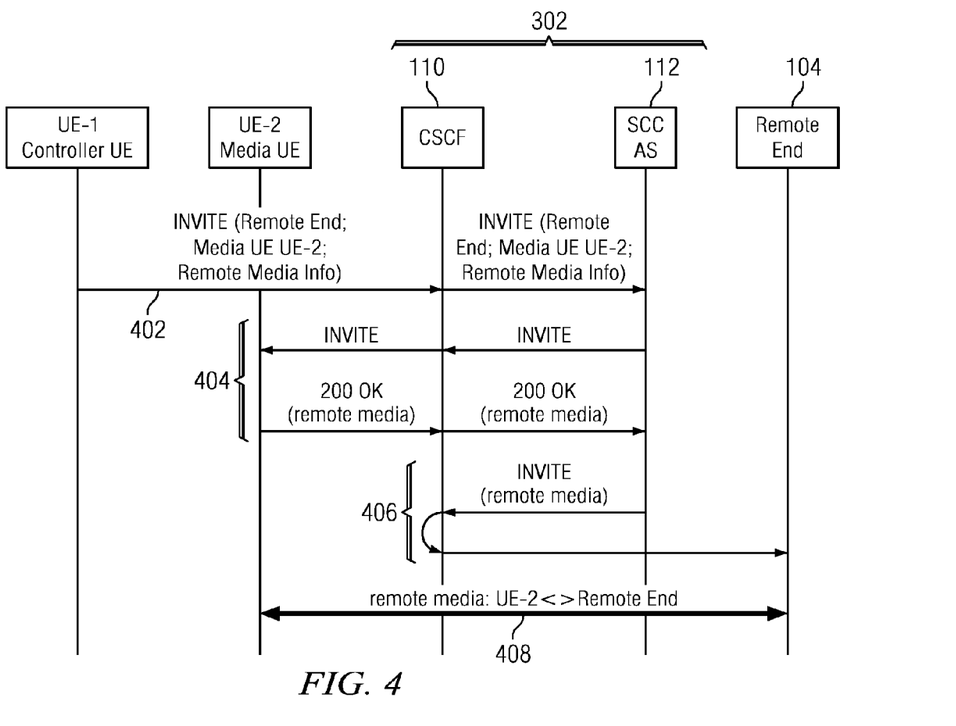
FIG. 4 is a message flow diagram for originating a remote media session in accordance with an embodiment of the present invention.

FIG. 4 illustrates a message flow diagram that may be used to establish a remote media flow during origination such as that illustrated in FIG. 1, in accordance with an embodiment of the present invention. The process begins in step 402, wherein UE-1 transmits, for example, a SIP INVITE message to the CSCF 110, which forwards the INVITE message to the SCC AS 112. The INVITE message indicates that UE-1 wants to initiate a remote media flow between the remote end 104 and the media UE, i.e., UE-2 in this example. Accordingly, the INVITE message may include parameters that indicate the remote end 104 with which a remote media flow is to be established, the media UE (UE-2) information, and other information necessary to setup a remote media flow with the media UE.

In step 404, the SCC AS 112 transmits via the CSCF 110, for example, a SIP INVITE message to the media UE (e.g., UE-2), and in step 406, the SCC AS 112 transmits via the CSCF 110, for example, a SIP INVITE message to the remote end 104. As a result, a remote media flow is established between the media UE-2 and the remote end 104. UE-1 maintains control of the session, i.e., UE-1 is the controller UE.

Figure 5:
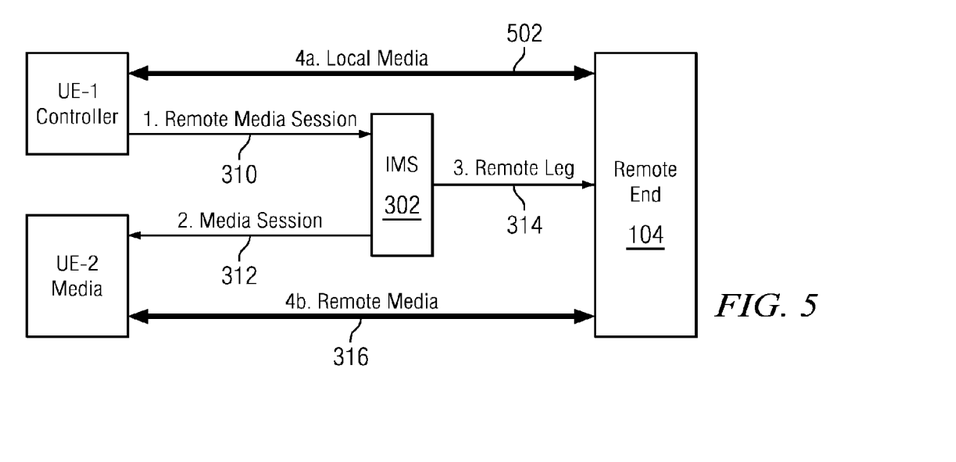
FIG. 5 is a signaling architecture diagram for originating a local media session and remote media session in accordance with an embodiment of the present invention.

FIG. 5 illustrates a similar situation as that discussed above with reference to FIG. 3, wherein like reference numerals refer to like elements, except that where FIG. 3 illustrates the origination of only a remote media flow, FIG. 5 illustrates that the controller UE establishes both a local media flow 502 as well as the remote media flow 316.

Figure 6:
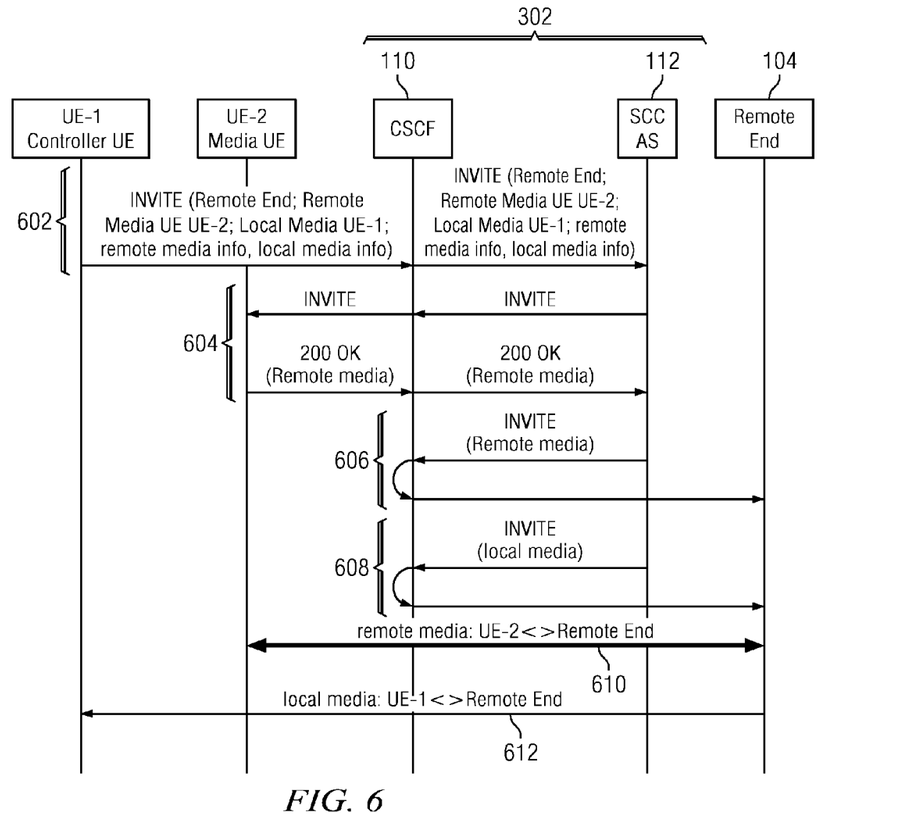
FIG. 6 is a message flow diagram for originating a local media session and remote media session in accordance with an embodiment of the present invention.

FIG. 6 illustrates a message flow diagram that may be used to establish a remote media flow and a local media flow during origination as illustrated in FIG. 5. The process begins in step 602, wherein UE-1 transmits, for example, a SIP INVITE message to the CSCF 110, which forwards the INVITE message to the SCC AS 112. The INVITE message indicates that UE-1 wants to initiate a remote media flow between the remote end 104 and the media UE, i.e., UE-2 in this example, and a local media flow between the remote end 104 and the controller UE, i.e., UE-1. Accordingly, the INVITE message may include parameters that indicate the remote end 104 with which the remote media flow and the local media flow are to be established, the remote media UE (UE-2) information, the local media UE (UE-1) information, and other information necessary to setup a remote media flow and the local media flow.

In step 604, the SCC AS 112 transmits via the CSCF 110, for example, a SIP INVITE message to the media UE (e.g., UE-2), and in step 606, the SCC AS 112 transmits via the CSCF 110, for example, a SIP INVITE message to the remote end 104. The SCC AS 112 also transmits via the CSCF 110, for example, a SIP INVITE message to the remote end 104 indicating that a local media flow is also to be established with UE-1, as indicated in step 608. As a result, a remote media flow is established between the media UE-2 and the remote end 104 and a local media flow is established between the controller UE-1 and the remote end 104. UE-1 maintains control of the session, i.e., UE-1 is the controller UE, and has a local media flow thereto.

Figure 7:
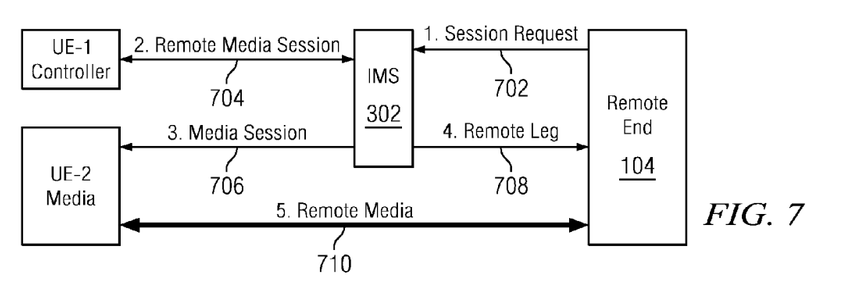
FIG. 7 is a signaling architecture diagram for terminating a remote media session in accordance with an embodiment of the present invention.

FIG. 7 illustrates, a signaling architecture diagram illustrating a process for terminating a remote media flow is shown in accordance with an embodiment of the present invention. Initially, the remote end 104 issues a session request directed to UE-1 as indicated by reference numeral 702. The session request is forwarded to UE-1 by the IMS system 302, and UE-1 provides instructions to the IMS system 302 that a remote media flow is to be established with UE-2, as indicated by reference numeral 704. As a result, the IMS system 302 initiates a remote media flow with UE-2 as indicated by reference numeral 706 and establishes a remote leg with the remote end 104 as indicated by reference numeral 708. As a result of this process, as indicated by reference numeral 710, a remote media flow is established between the remote end 104 and the media UE-2, wherein UE-1 acts as the controller UE.

Figure 8:
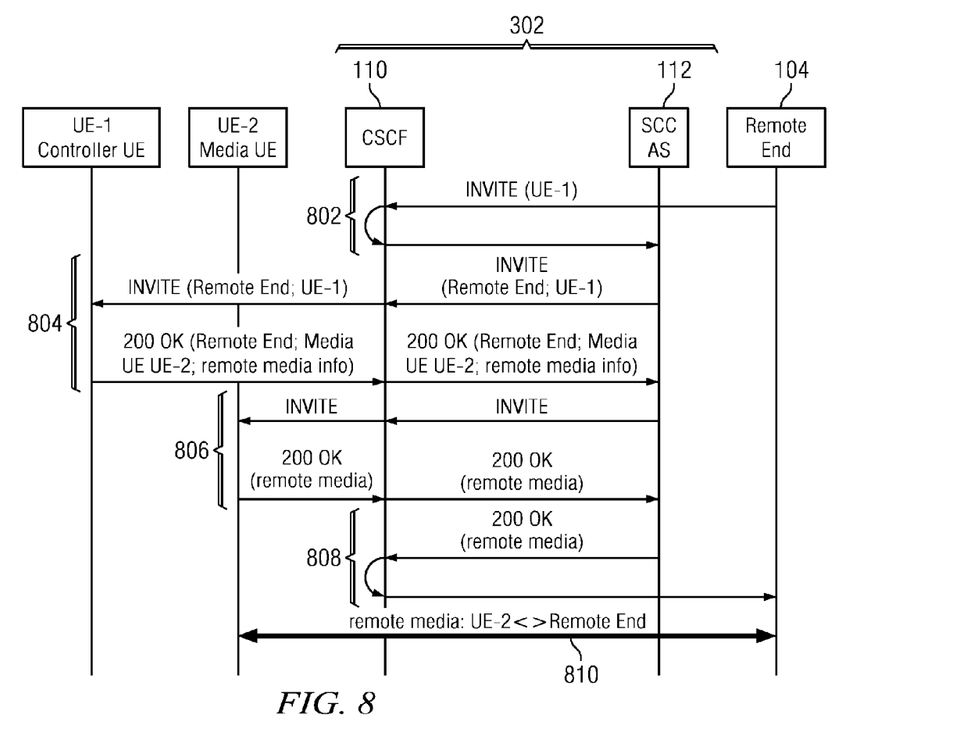
FIG. 8 is a message flow diagram for terminating a remote media session in accordance with an embodiment of the present invention.

FIG. 8 illustrates a message flow diagram that may be used to establish a remote media flow during termination such as that illustrated in FIG. 7, in accordance with an embodiment of the present invention. The process begins in step 802, wherein the remote end 104 transmits, for example, a SIP INVITE message to the CSCF 110, which forwards the SIP INVITE message to the SCC AS 112. The INVITE message indicates that the remote end 104 wants to initiate a media flow between the remote end 104 and the UE-1. In step 804, the SCC AS 112 transmits via the CSCF 110, for example, a SIP INVITE message to the designated UE (e.g., UE-1), which responds with a message, e.g., a SIP 200 OK message, having parameters that indicate that the user wishes to receive the flow on a different UE, e.g., UE-2 in this example. In step 806, the SCC AS 112 transmits the INVITE message to the media UE UE-2, and upon receiving the OK message from UE-2, the SCC AS 112 transmits a message, e.g., a SIP 200 OK message, to the remote end 104. As a result, a remote media flow is established between UE-2 and the remote end 104 such that UE-1 maintains control of the session, i.e., UE-1 is the controller UE, as indicated in step 810.

Figure 9:
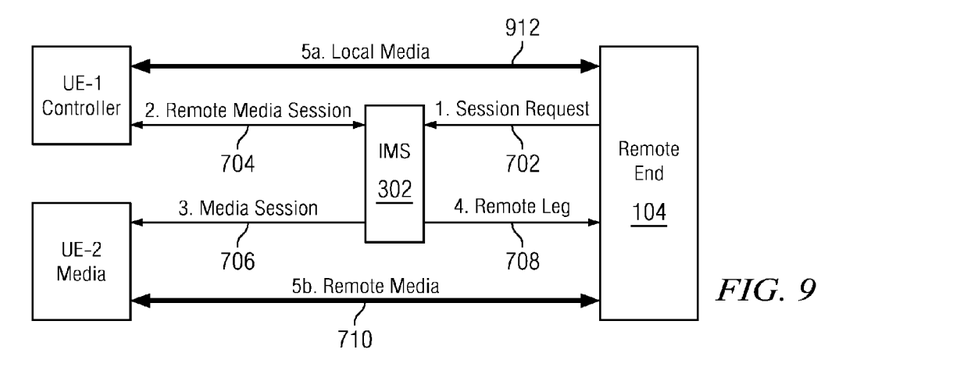
FIG. 9 is a signaling architecture diagram for terminating a local media session and a remote media session in accordance with an embodiment of the present invention.

FIG. 9 illustrates a similar situation as that discussed above with reference to FIG. 7, wherein like reference numerals refer to like elements, except where FIG. 7 illustrates the termination of only a remote media flow, FIG. 9 illustrates that the controller UE UE-1 establishes both a local media flow 912 as well as a remote media flow 710.

Figure 10:
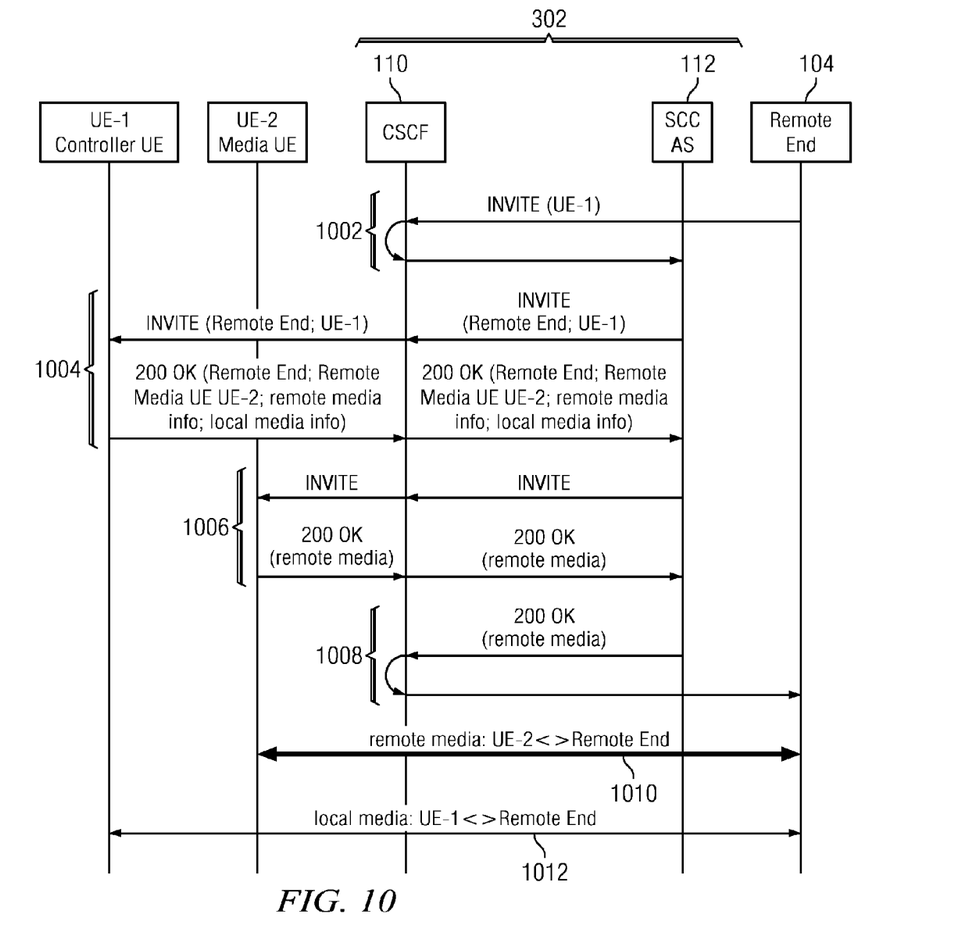
FIG. 10 is a message flow diagram for terminating a local media session and a remote media session in accordance with an embodiment of the present invention.

FIG. 10 illustrates a message flow diagram that may be used to establish a local media flow and a remote media flow during termination such as that illustrated in FIG. 9, in accordance with an embodiment of the present invention. The process begins in step 1002, wherein the remote end 104 transmits, for example, a SIP INVITE message to the CSCF 110, which forwards the INVITE message to the SCC AS 112. The INVITE message indicates that the remote end 104 wants to initiate a media flow between the remote end 104 and the UE-1. In step 1004, the SCC AS 112 transmits via the CSCF 110, for example, a SIP INVITE message to the designated UE (e.g., UE-1), which responds with a message, e.g., a SIP 200 OK message, having parameters that indicate that the user wishes to receive the media flow as a local media flow on UE-1 and a remote media flow on UE-2. In step 1006, the SCC AS 112 transmits the INVITE message to the media UE UE-2, and upon receiving the OK message from UE-2, the SCC AS 112 transmits an OK message to the remote end 104. As a result, a local media flow is established between UE-1 and the remote end 104, and a remote media flow is established between UE-2 and the remote end 104, such that UE-1 maintains control of the session, i.e., UE-1 is the controller UE, as indicated in steps 1010 and 1012, respectively. As noted above, the SCC AS 112 acts to separate the media flow to and from the remote end 104 into the media flows corresponding to the local media flow and the remote media flow, presenting a single remote leg to the remote end 104.

Figure 11A:
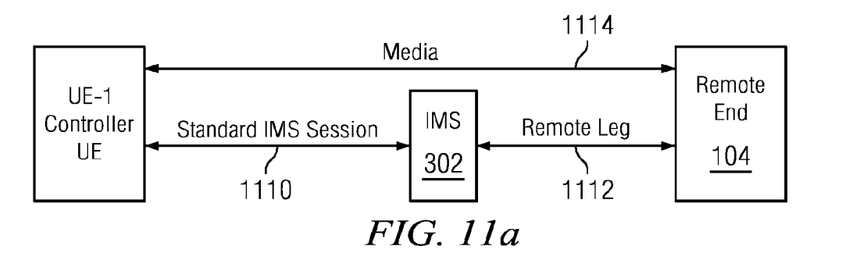
FIGS. 11a and 11b are signaling architecture diagrams illustrating a transfer of the session control from one device to another device in accordance with an embodiment of the present invention.
Figure 11B:
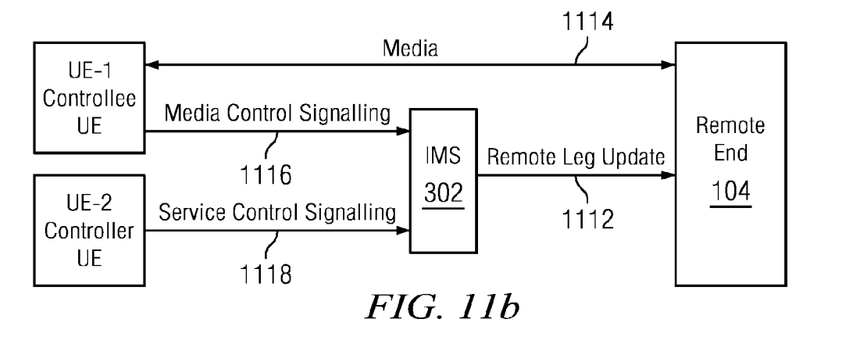

FIGS. 11*a* and 11*b* illustrate a situation in which the session control is transferred from one UE to another UE. One of ordinary skill in the art will appreciate that in the embodiments discussed above involved establishing a media flow on a different UE, but the session control remained with UE-1. In contrast, the embodiment illustrated in FIGS. 11*a* and 11*b* transfers the session control from UE-1 to UE-2. It should be noted that one or more media flows may also be transferred from UE-1 to UE-2 along with the session control.

Referring now to FIG. 11*a*, there is illustrated an IMS session already established such that UE-1 is the controller UE. The IMS session may be established in any suitable manner such that an IMS session is established between the IMS system 302 and UE-1 as indicated by reference numeral 1110 and a remote leg is established between the IMS system 302 and the remote end 104 as indicated by reference numeral 1112. Accordingly, a local media flow is established between the remote end 104 and UE-1 as indicated by reference numeral 1114. At this point, UL-1 is the controller UE and the media UE.

FIG. 11*b* illustrates the signaling architecture after transfer of the session control from UE-1 to UE-2. While the remote leg 1112 remains established between the remote end 104 and the IMS system 302, the IMS session 1110 of FIG. 9*a* has been separated into a media control signaling path between the IMS system 302 and UE-1 and a session control signaling path between the IMS system 302 and UE-2 as indicated by reference numerals 1116 and 1118, respectively. The media flow remains between the remote end 102 and UE-1. In this situation, UE-1 is referred to as the controlee UE and UE-2 is referred to as the controller UE.

Figure 12:
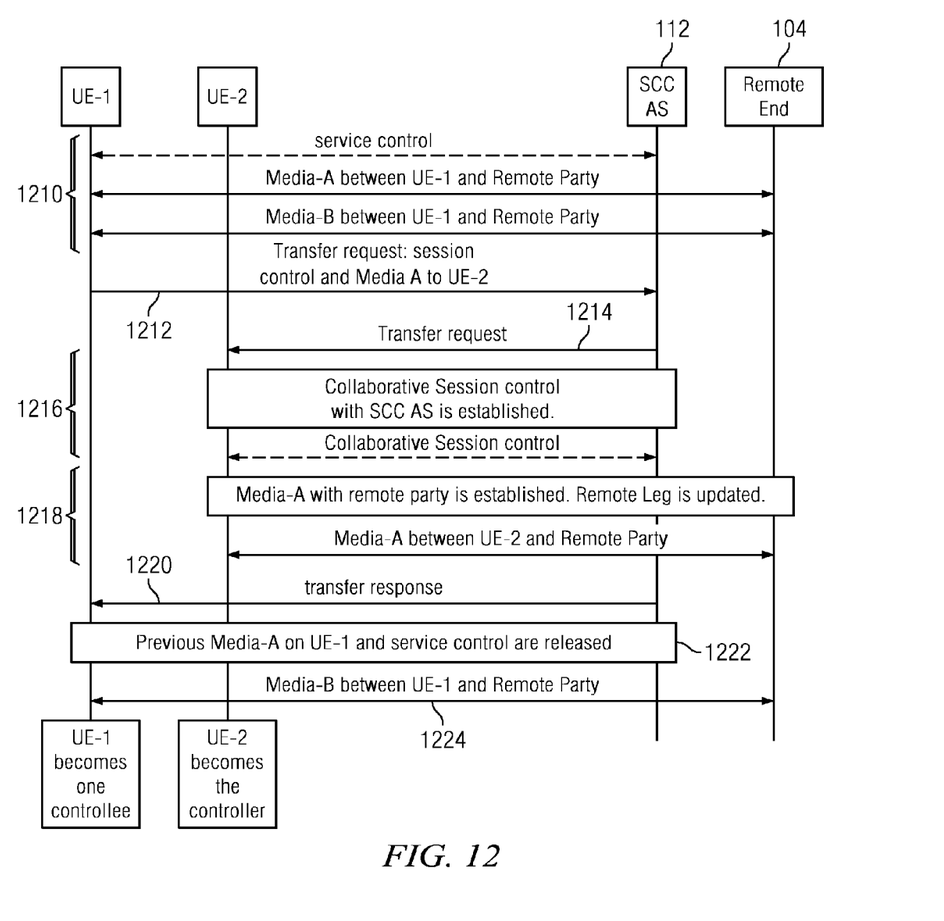
FIG. 12 is a message flow diagram for transferring the session control from one device to another device in accordance with an embodiment of the present invention.

FIG. 12 is a message flow diagram that may be used to affect the transfer of the session control from a controlee UE to a controller UE. It should be noted that the CSCF 110 is not shown in FIG. 12 for illustrative purposes only, and that one of ordinary skill in the art will realize that signaling between the remote end 104 and the UE may pass through or be facilitated by the CSCF.

The process begins in step 1210, wherein a local media flow is established between the remote end 104 and the controller UE, UE-1 at this point. For illustrative purposes, FIG. 12 illustrates two media flows, e.g., media flow A and media flow B. Media flow A will be transferred to UE-2 along with the session control signaling. Media flow B will remain on UE-2 and will become a remote media flow. Fewer or more media flows may be used.

In step 1212, UE-1 issues a transfer request to SCC AS 112 to request transfer of the session control and media flow A to UE-2. The SCC AS 112 transmits the transfer request to UE-2, wherein the parameters of the transfer request indicate that the session control and media flow A are to be transferred to UE-2, as indicated in step 1214. As a result of the transfer request, collaborative session control is established between UE-2 and the SCC AS 112, as indicated in step 1216.

After establishing the collaborative session control, the SCC AS 112 establishes a local media flow between UE-2 and the remote end 104 as indicated in step 1218. Upon successful transfer of the session control and the media flow A, the SCC AS 112 responds to the UE-1 that the transfer has been completed in step 1222, at which point, in step 1224, the media flow A and the session control are released from UE-1. As a result of this process, a remote media flow exists between UE-1 and the remote end 104, and a local media flow exists between UE-2 and the remote end 104. One of ordinary skill in the art will realize that UE-2 became the controller UE and UE-1 switched from being the controller to the controlee.

Figure 13:
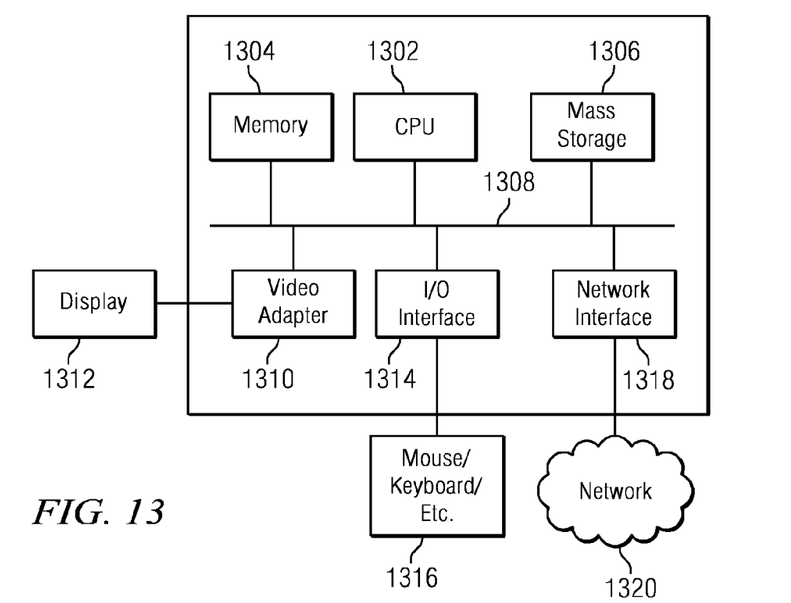
FIG. 13 is a block diagram of a network element in accordance with an embodiment of the present invention.

Referring now to FIG. 13, a block diagram of a network element 1300 is provided in accordance with an embodiment of the present invention. The network element 1300 depicts a general purpose platform and the general components and functionality that may be used to implement any or all of the UE, the SCC AS 112, or the CSCF 110. The network element 1300 may include, for example, a central processing unit (CPU) 1302, memory 1304, and a mass storage device 1306 connected to a bus 1308 configured to perform the processes discussed above. The network element 1300 may further include a video adapter 1310 to provide connectivity to a local display 1312 and an I/O interface unit 1314 to provide an input/output interface for one or more input/output devices 1316, such as a mouse, a keyboard, printer, tape drive, CD drive, or the like.

The processing unit 210 also includes a network interface 1318, which may be a wired link, such as an Ethernet cable or the like, and/or a wireless/cellular link. For example, the network interface 1318 may comprise an Ethernet connection if the network element 1300 acts as CSCF or SCC AS, or even some UE. Mobile UEs, on the other hand, the network work element 1300 may comprise a suitable receiver and transmitter for wireless communications. It should be noted that the network element 1300 may include other components. For example, the network element 1300 may include power supplies, cables, a motherboard, removable storage media, cases, and the like. These other components, although not shown, are considered part of the network element 1300.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that different network elements, messaging, protocols, and/or the like may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for originating a media flow, the method comprising:
    receiving, by an application server from a first device, a request to originate a communications session with a remote end, the request indicating that a remote media flow is to be established on a second device;
    establishing, by the application server, the remote media flow between the second device and the remote end;
    receiving, by the application server, session control signaling for the remote media flow from the first device;
    receiving, by the application server, media control signaling for the remote media flow from the second device, wherein the first device and the second device are different mobile stations connected to a common wireless access network;
    aggregating, by the application server, the media control signaling received from the second device with the session control signaling received from the first device into an aggregated signaling; and
    transmitting, by the application server, the aggregated signaling to the remote end.

2. The method of claim 1, wherein the communications session includes two or more media flows.

3. The method of claim 2, wherein the request includes a request to establish a local media flow.

4. The method of claim 3, further comprising establishing a local media flow between the first device and the remote end.

5. The method of claim 1, wherein establishing the remote media flow between the second device and the remote end comprises:
    transferring the media control signaling from the first device to the second device without transferring the session control signaling, wherein the session control signaling remains with the first device.

6. The method of claim 1, wherein the media control signaling and the session control signaling are part of a common IP Multimedia Subsystem (IMS) session.

7. A method for terminating a media flow, the method comprising:
    receiving, by an application server, a request from a remote end to terminate a communications session on a first device;
    transmitting, by the application server, a termination request to the first device;
    receiving, by the application server, an acknowledgement message from the first device, the acknowledgement message indicating that a remote media flow is to be established on a second device;
    establishing, by the application server, the remote media flow on the second device;
    receiving, by the applications server, session control signaling for the remote media flow from the first device;
    receiving, by the applications server, media control signaling for the remote media flow from the second device;
    aggregating, by the application server, the media control signaling from the second device with the session control signaling from the first device into an aggregated signaling; and
    presenting, by the application server, the aggregated signaling to the remote end, wherein the first device and the second device are different mobile stations connected to a common wireless access network.

8. The method of claim 7, further comprising receiving an indication that a local media flow is to be established on the first device.

9. The method of claim 7, wherein establishing the remote media flow between the second device and the remote end comprises:
    transferring the media control signaling from the first device to the second device without transferring the session control signaling, wherein the session control signaling remains with the first device.

10. The method of claim 7, wherein the media control signaling and the session control signaling are part of a common IP Multimedia Subsystem (IMS) session.

11. A method of creating a remote media session, the method comprising:
    transferring session control signaling for a common IP Multimedia Subsystem (IMS) session from a source device to a target device, wherein media control signaling for at least one media flow of the common IMS session remains with the source device, wherein the session control signaling and the media control signaling are both part of the common IMS session, and wherein the source device and the target device are different mobile stations connected to a common wireless access network
    receiving the session control signaling from the target device;
    receiving the media control signaling for the media flow from the source device;
    combining the session control signaling received from the target device and the media control signaling received from the source device to form an aggregated signaling; and
    communicating the aggregate signaling to a remote end.

12. The method of claim 11, further comprising transferring another media flow from the source device to the target device.

13. An IP Multimedia Subsystem (IMS) network comprising:
    a call session controller configured to communicate with a remote end; and
    an application server communicatively coupled to the call session controller, the application server configured to establish a remote media flow during a communications session between a first device and the remote end, wherein the remote media flow extends between a second device and the remote end, wherein session control signaling for the remote media flow remains with the first device after media control signaling for the remote media flow is transferred to the second device, wherein the media control signaling and the session control signaling are part of a common IMS session, wherein the first device and the second device are different mobile stations connected to a common wireless access network, and
    wherein the applications server is further configured to receive the session control signaling for the remote media flow from the first device, to receive the media control signaling for the remote media flow from the second device, to combine the session control signaling received from the first device and the media control signaling received from the second device to form an aggregated signaling, and to communicate the aggregate signaling to a remote end.

14. The IMS network of claim 13, wherein the application server is configured to transfer the session control signaling from the first device to the second device after the remote media flow is established.

15. The IMS network of claim 14, wherein the application server is further configured to maintain the at least one media flow at the first device after transferring the session control signaling from the first device to the second device.

16. An apparatus comprising:
a processor; and
a computer readable storage medium storing programming for execution by the processor, the programming including instructions to:
  establish a local media flow of a media session between a first device and a remote end;
  establish a remote media flow between a second device and a remote end;
  transfer media control signaling of the media session to the second device, wherein session control signaling of the media session remains established between the first device and the remote end after the media control signaling is transferred to the second device, wherein the first device is different from the second device, and wherein the first device and the second device are configured to access a common wireless access network;
  receive the session control signaling for the remote media flow from the first device;
  receive the media control signaling for the remote media flow from the second device;
  aggregate the media control signaling received from the second device with the session control signaling received from the first device into an aggregated signaling; and
  forward the aggregated signaling to the remote end.

17. The apparatus of claim 16, wherein the media control signaling and the session control signaling are part of a common IP Multimedia Subsystem (IMS) session.

* * * * *